United States Patent
Millman

[15] 3,655,008
[45] Apr. 11, 1972

[54] SOUND SUPPRESSING APPARATUS
[72] Inventor: Victor Millman, San Diego, Calif.
[73] Assignee: Rohr Corporation, Chula Vista, Calif.
[22] Filed: Jan. 28, 1971
[21] Appl. No.: 110,460

[52] U.S. Cl................181/33 E, 181/33 HC, 181/33 HD, 239/265.13, 239/265.17, 239/265.33
[51] Int. Cl..............B64c 9/38, F01n 1/14, B64d 33/06
[58] Field of Search..........181/33 E, 33 H, 33 HA, 33 HB, 181/33 HC, 33 HD, 43, 51; 239/127.3, 265.13, 265.33, 265.17

[56] References Cited

UNITED STATES PATENTS

| | | | |
|---|---|---|---|
| 3,027,710 | 4/1962 | Maytner | 181/33 HC |
| 3,174,282 | 3/1965 | Harrison | 181/33 HC |

FOREIGN PATENTS OR APPLICATIONS

| | | | |
|---|---|---|---|
| 1,436,412 | 3/1966 | France | 181/33 HC |
| 653,544 | 5/1961 | Great Britain | 181/33 E |
| 1,019,857 | 2/1966 | Great Britain | 181/33 HC |

*Primary Examiner*—Robert S. Ward, Jr.
*Attorney*—George E. Pearson

[57] ABSTRACT

Elongate noise reflecting and suppressing shield of upwardly concave cross section is carried by engine housing in generally horizontal attitude. Forward end of shield has pivotal mounting means on transverse axis which move fore and aft on tracks carried by housing. Aft end of shield is maintained against downward swinging by cables attached to its aft end and trained over pulleys on free end of mast pivotally mounted on wing over nozzle exit. Forward ends of cables are connected to servo motor. Mast is swingable down flush with wing for cruise flight and deployed to upright position for takeoff and low level flight. When drive means moves pivotal mounting means aft to deploy shield to position beneath and intercepting jet stream. the servo motor pays out cables at proper rate to maintain attitude of shield substantially constant. When shield is fully deployed, aerodynamic reaction means on aft end of shield raise it in response to relative wind to the proper interception angle to produce maximum noise reduction.

12 Claims, 4 Drawing Figures

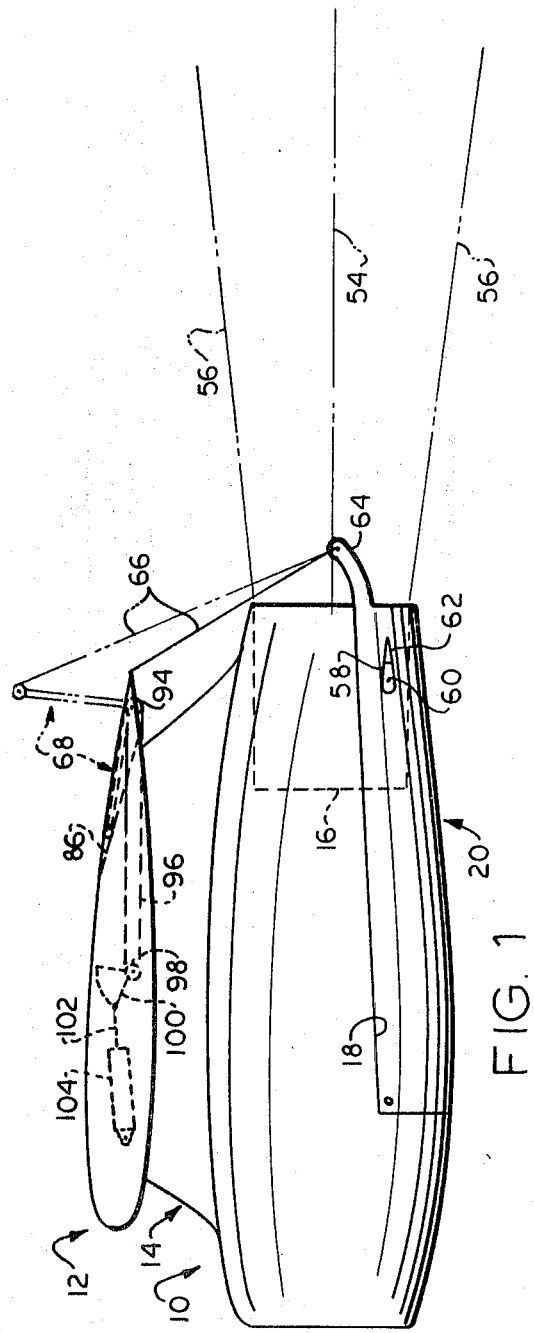
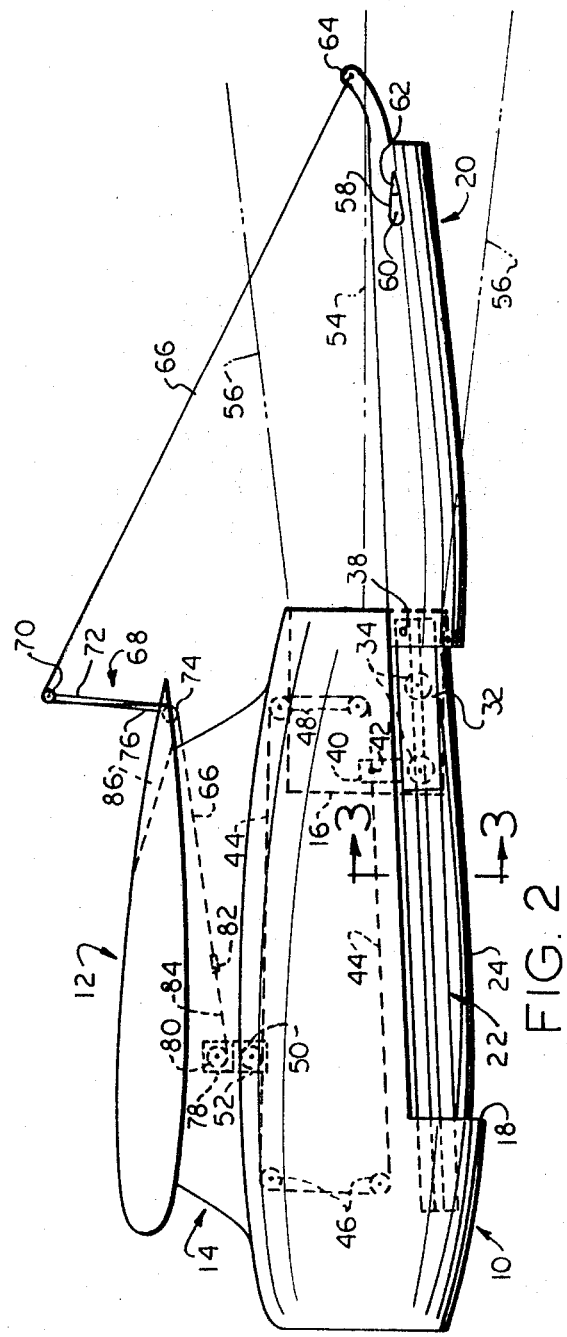

PATENTED APR 11 1972 3,655,008

INVENTOR.
VICTOR MILLMAN
BY
George E. Pearson
ATTORNEY

SOUND SUPPRESSING APPARATUS

BACKGROUND OF THE INVENTION

This invention lies in the field of sound suppression of gas turbine or jet engines, which produce reaction thrust by ejecting a high velocity stream of gas from the exhaust nozzle or tail pipe of the gas turbine. One of the problems of airplanes equipped with jet engines on which a great deal of effort has been expended is that the exhaust stream creates a very high level of sound energy or "noise" in a wide range of frequencies, and a portion of this noise reaches the ground from low flying airplanes, as during takeoff and climb, at an energy level which is not acceptable to the public.

The invention is directed to a system in which that portion of the noise which produces objectionable effects at ground level is largely prevented from being emitted downward while no control is exercised over the noise which is radiated upward. It is directed particularly to a system which acts to reflect the objectionable noise upward and which will function just as effectively with a simple nozzle as with one which is equipped with other sound suppression devices. Various schemes have been proposed which make use of sound reflection to some extent but they have generally failed because the reflector function was only a small part of a complicated apparatus or because they were so designed and constructed that they were not capable of reflecting more than a minimal amount of the objectionable noise.

SUMMARY OF THE INVENTION

The present invention provides a very satisfactory solution to the problem with a limited amount of equipment and very few moving parts requiring repair, maintenance or adjustment. Generally stated, the system includes an elongate noise reflecting and suppressing shield provided with pivotal mounting means at its forward end which travel in tracks carried at opposite sides of the engine housing for fore and aft movement. The aft end of the shield swings upward and downward about the lateral axis of the pivotal mounting means. Drive means are provided to move the pivotal mounting means forward to stowed position and rearward to deployed operative position. In deployed position, the pivotal mounting means are adjacent to the nozzle exit and the shield trails behind to intercept the jet stream boundary.

The shield is elongate and preferably trough-like and upwardly concave. It is also wide enough to embrace the lower portion of the jet stream at the nozzle exit. Means are provided, preferably in the form of aerodynamic reacting vanes carried by the shield, for producing sufficient lifting force to support the rear portion of the shield and force it into position to intercept the expansion boundary of the jet stream issuing from the nozzle.

The vanes may be pre-set for each installation after several test flights to determine the proper setting to lift the shield to the proper angle with respect to the nozzle axis at which optimum results are obtained. Alternatively the vanes, or portions of them, may be movable about lateral axes.

Extensible tension cable means are provided to limit the drop or angular departure of the shield from the jet stream axis to a position somewhat less than the optimum but sufficient to produce significant noise suppression, and to relieve the structural load of the forward hinge point permitting a lighter weight structure.

It has been determined that sound waves are emitted substantially radially outward from the cone of noise produced by the jet stream so that only the lower half of the cone produces the objectionable ground-directed noise. Since the shield encompasses the lower half, approximately, of the jet stream immediately downstream of the nozzle exit where the noise is initiated, and the stream is forced to flow along its length, the shield is able to reflect upwardly the objectionable sound waves while it is not necessary to control those which are originally directed upwardly. Thus the device functions very well with simple nozzles or with those which have other suppressor devices. The present invention comprises an improvement over the invention disclosed and claimed in the application of Millman et al., Ser. No. 847,069, filed Aug. 4, 1969, now U.S. Pat. No. 3,590,943 issued July 6, 1971.

BRIEF DESCRIPTION OF THE DRAWINGS

Various other advantages and features of novelty will become apparent as the description proceeds in conjunction with the accompanying drawing, in which:

FIG. 1 is a schematic side elevational view of an engine nacelle or housing mounted to a wing and showing the apparatus of the invention in stowed position;

FIG. 2 is a view similar to FIG. 1 showing the apparatus in deployed operative position;

DESCRIPTION OF PREFERRED EMBODIMENTS

Figure 3:
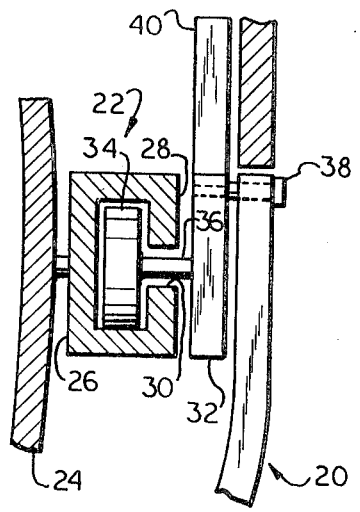
FIG. 3 is a sectional view taken on line 3—3 of FIG. 2.

The general arrangement illustrated in FIG. 1 shows the apparatus mounted on an airplane in stowed position ready to be deployed for use in takeoff and climb operation. An engine, not shown, is mounted within nacelle or housing 10 suspended from wing 12 by a pylon 14. The engine is provided with a tail pipe or nozzle 16, shown in broken lines, which may terminate in about the same general plane as the housing. A generally semi-cylindrical opening 18 is formed in the lower part of the housing and is dimensioned to receive the trough-shaped shield 20 and associated elements in a manner to define a streamlined configuration for normal cruising flight. If it is desired to maintain an unbroken external contour, the housing may be open only at the rear and the shield may be stowed inside. An elongate generally axially directed track 22 is mounted on the inner wall 24 at each side of the housing and extends forwardly of opening 18.

As best seen in FIG. 3, track 22 is in the form of a rectangular channel, the web 26 of which is secured by any suitable means to inner wall 24 of the housing. Flanges 28 define a narrow elongate slot 30 leading into a rectangular guide passage. The pivotal mounting means for shield 20 is shown as including a short beam 32 provided with a pair of longitudinally spaced rollers 34 mounted for longitudinal rolling movement in the guide passage of track 22. The rollers are connected to beam 32 by axles 36 which pass freely through slot 30. Thus the beam may move from its stowed position at the forward end of track 22 to the deployed position shown in FIG. 2.

Shield 20 is pivotally connected at its forward end to the beam by an axle bolt 38 threaded into the beam. An arm 40 extending upward from the beam is connected at 42 to an endless cable 44 passing around fore and aft guide pulleys 46, 48 to pulley 50, on which it is preferably multiple wrapped. Pulley 50, together with its motor 52, constitutes drive means to move the pivotal mounting means and shield 20 generally axially between stowed and deployed positions. It will be understood that all of this equipment is duplicated at the opposite side of the housing. Although the beam support is presently preferred for structural reasons, the design may be simplified if desired by mounting a roller 34 directly on each axle bolt 38 and connecting cable 44 to the axle bolt.

As will be noted in FIG. 2, when the pivotal mounting means are fully deployed, the shield 20 trails behind the nozzle exit with its forward end slightly overlapping the nozzle and with its longitudinal axis substantially horizontal but making a slight angle with the axis 54 of the nozzle. The shield may swing vertically upward or downward about its pivotal axis which is transverse to the nozzle axis. As previously mentioned, it is generally trough-shaped or concave upward in cross section and is normally generally semi-cylindrical. Preferably it is so dimensioned that it will surround the lower half of the expansion boundary 56 of the jet stream and reflect upward the major portion of the noise emitted thereby. It has been determined that excellent results are obtained when the length of the shield is four to six times the diameter of the nozzle.

The attitude of shield 20 is controlled in flight by mechanism which includes aerodynamic reaction means or vanes 58 extending laterally from each side of the shield. The vanes may be pivoted at 60 for adjustment or they may be fixed and provided with flaps 62 movable to vary the lift characteristics of the vanes. In the simplest form, the vanes are pre-settable on the ground to attitudes determined by prior experiment or calculation to be appropriate for supporting the shield in optimum operating relation with the jet stream in a given installation. A more automatic arrangement, not shown, utilizes a sensor mounted on the shield to detect the position of attachment of the expanding jet. The sensor sends signals to a servo motor which then adjusts the angle of the vane or flap as necessary.

The pivotal mounting of shield 20 permits it to swing upward or downward from the attitude shown in FIGS. 1 and 2. In flight it is supported at a desired angle by vanes 58 but the aerodynamic reaction is insufficient to accomplish this function completely at standstill or ground roll speeds. Consequently, means must be provided to support the aft end of the shield under these conditions without undue loading of the pivot connection 38. In the present invention this takes the form of extensible and retractable tension means connected between a point above the nozzle exit where loads can be taken out through the wing spar thereby alleviating loads on the engine support structures and the aft end of the shield.

Figure 4:
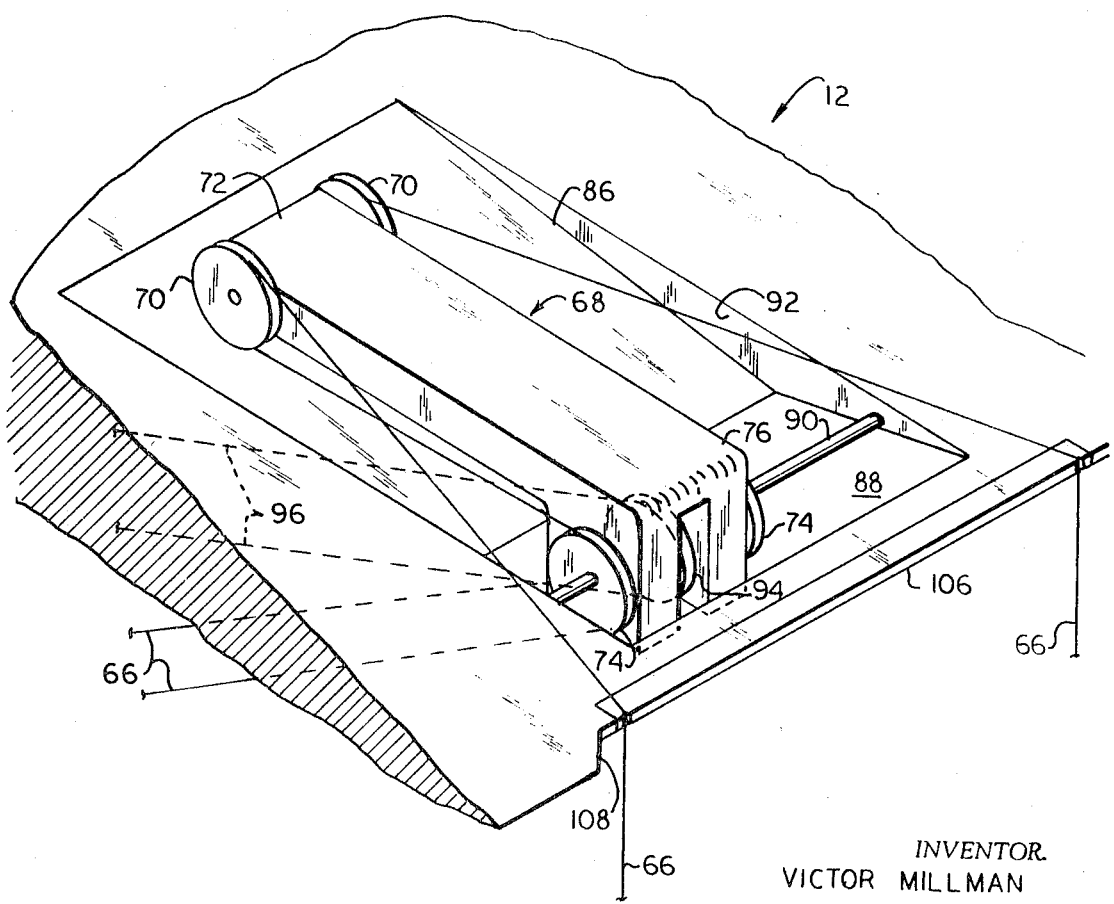
FIG. 4 is a schematic perspective view showing certain details of construction.

The presently preferred form is best shown in FIGS. 2 and 4, where it will be seen that a bracket or ear 64 is provided at each side of the aft end of the shield and a first end of an elongate flexible cable 66 is attached to each bracket. A retractable mast 68 is mounted at the aft end of wing 12 and is shown in FIG. 2 in its upright operative position. A first pair of guide pulleys 70 are mounted on a transverse axis at the outer free end 72 of the mast and a second pair of guide pulleys 74 are mounted at or adjacent to the inner end 76 of the mast. A servo motor 78 having a takeup pulley 80 is located adjacent to servo motor 52 although it may be located near the mast if desired. Cables 66 are trained over pulleys 70 and pulleys 74 and then connected to takeup pulley 80. Although the cables may be individually wrapped on separate pulleys 80 it is preferred to connect them with a splice 82 to a single cable 84.

When the shield 20 is stowed or deployed by actuation of drive means 52, cables 66 are reeled in or payed out in conjunction with the movement of the shield. Servo motor 78 operates independently of the operation of servo motor 52 because the amount of cable extension and retraction is not the same. The length of cables 66 is varied at the proper rate to maintain the attitude of the shield substantially as shown during all stages of deployment. For standstill and ground roll cables 66 support the aft end of the shield so that it will not strike the ground and it will be in a position to produce a substantial amount of sound suppression. When an adequate degree of forward speed is attained cables 66 may be further extended a slight amount if desired and vanes 58 and flaps 62 will now aerodynamically support the vane at the proper predetermined angle of interception of the jet stream to produce optimum sound suppression.

When the shield is retracted for normal high altitude cruising flight it is undesirable to have the mast extend upward above the wing because of the high resultant drag. While the mast may be folded down on the upper surface of the wing substantially flush, it is shown herein as retractable into a recess. This is best shown in FIG. 4, where recess 86 terminates rearwardly in an aperture 88 extending through wing 12. Mast 68 is fixedly mounted on pivot shaft 90 which is journaled in walls 92 of the recess. A centrally located pulley 94 is also fixedly mounted on shaft 90, and an endless cable 96 is trained on pulley 94 and preferably anchored thereto to prevent slippage.

Turning to FIG. 1, cable 96 is also trained on pulley 98 and preferably anchored thereto. Pulley 98 is provided with a lever arm 100 pivotally connected to piston rod 102 of servo motor 104. When the servo motor is actuated, it swings lever arm 100 through a small angle as shown and acts through pulleys 94 and 98 and cable 96 to swing the mast between stowed and deployed positions. In the stowed position, the mast lines substantially entirely within recess 86 to minimize drag.

Pulleys 74 are freely rotatably mounted on shaft 90 to produce a geometry which permits mast 68 to swing between stowed and deployed positions with practically no change in the effective length of cables 66. With the mast stowed as seen in FIG. 4, the cables running from brackets 64 pass over rub strip 106 extending across a notch 108 in the trailing edge of the wing and then extend over pulleys 70 and 74 to the takeup pulley 80. In this position, they are pulled taut and the aft end of the shield is held firmly in its uppermost position. When the mast swings up to deployed position, the total distance from pulleys 70 to brackets 64 is slightly less so that the effective length of the cables is slightly greater, and the aft end of the shield is lowered a small amount. This is desirable to facilitate the deployment of the shield. The relative positions of the pulleys and the rub strip may be adjusted to decrease the change in effective cable length if desired.

In the Millman et al. application mentioned above, the beam carrying the pivotal mounting means for the forward end of the noise shield was provided with a stop to engage the forward edge of the shield and prevent it from drooping. Since the shield is very long and heavy, its cantilever beam effect imposes a very high shear load on the pivot pins which is undesirable. In the present construction the mast and cables support the aft end of the shield, and consequently the shear load on axle bolts 38 is very greatly reduced.

Another feature of the construction disclosed herein is that, since servo motor 78 operates independently of servo motor 52, it can be controlled in the deployed position of the shield to raise and lower it to any desired extent. Therefore, it may be used directly to adjust the angle of interception of shield 20 and the aerodynamic reaction vanes may be dispensed with.

While the servo motor 78 and takeup reel 80 are the preferred mechanism for controlling cables 66, they may be replaced if desired by a long stroke piston type servo motor.

It will be apparent that the invention disclosed herein provides a simple and effective means for deploying and controlling a noise suppression shield and that the components are highly reliable in action and durable, resulting in minimal initial cost and maintenance expense.

Having thus described the invention, what is claimed as new and useful and is desired to be secured by U.S. Letters Patent is:

1. Sound suppressing apparatus for use in combination with an aircraft propelled by a jet engine, comprising: a housing surrounding a jet engine having a rearwardly discharging jet nozzle; an elongate noise reflecting and suppressing shield having an upwardly concave cross section and arranged in a generally horizontal fore and aft attitude; pivotal mounting means at the forward end of the shield engaging a portion of the housing to support the shield for swinging about a generally horizontal axis transverse to the axis of the nozzle; drive means to move the pivotal mounting means fore and aft on the housing to move the shield between stowed position forward of the nozzle exit and deployed position extending aft with its forward end adjacent to the nozzle exit to underlie and intercept the lower portion of the jet stream issuing from the nozzle; and extensible and retractable support means associated with the housing and connected to the aft end of the shield to restrain the shield against downward swinging about its pivotal mounting means; the support means being extensible and retractable in conjunction with fore and aft movement of the pivotal mounting means to maintain the attitude of the shield substantially constant at all stages of deployment.

2. Apparatus as claimed in claim 1; the support means being extensible and retractable independently of the drive means to raise and lower the aft end of the shield and vary its angle of interception of the jet stream.

3. Apparatus as claimed in claim 1; the support means being further extensible to lower the aft end of the shield; and aerodynamic reaction means attached to the aft portion of the shield to swing it upward to predetermined angles of interception in response to relative wind forces on the aerodynamic reaction means.

4. Apparatus as claimed in claim 1; the support means including guide means located above the nozzle exit; elongate flexible tension means connected at one end to the aft end of shield and extending up over the guide means; and a servo motor connected to the other end of the tension means.

5. Apparatus as claimed in claim 4; the guide means including a mast retractable to a position substantially out of the air stream and extensible to a position with its free end above the nozzle exit; and guide members at the free end of the mast; the tension means extending over the guide members.

6. Apparatus as claimed in claim 5; the mast being pivoted about an axis transverse to the nozzle axis to swing downward and forward to retracted position and upward and rearward to extended operative position.

7. Apparatus as claimed in claim 5; a wing located above and connected to the housing; the mast being pivotally mounted on the wing about an axis transverse to the nozzle axis for swinging between a retracted position substantially flush with the wing and an extended position directed upward and away from the wing.

8. Apparatus as claimed in claim 7; the wing being provided with a recess in its aft portion; and the mast being retractable into the recess.

9. Apparatus as claimed in claim 7; and stop means carried by the wing and engageable by the mast to limit the amount of its angular extension.

10. Apparatus as claimed in claim 1; the support means including a mast having a first end pivotally mounted above the nozzle exit on an axis transverse to the nozzle axis and swingable downward and forward to retracted position substantially out of the air stream and swingable upward and aft to operative position; a pair of pulleys at the second, free end of the mast rotatable on an axis parallel to the pivotal axis of the mast; a pair of tension cables each connected at one to the aft end of the shield and extending upward and over the pulleys; and a servo motor connected to the other ends of the cables to extend and retract them during deployment and stowing of the shield.

11. Apparatus as claimed in claim 10; a wing located above and connected to the housing; and the mast being pivotally mounted on the aft portion of the wing.

12. Apparatus as claimed in claim 10; and a second pair of pulleys rotatably mounted substantially at the pivotal mounting of the mast; the cables being further trained about the second pair of pulleys to minimize change in the effective length of the cables during stowing and deployment of the mast.

* * * * *